2,992,161
ZINC ETHYLENE BIS(DITHIOCARBAMATE) COMPOSITIONS

Albert L. Flenner, Wilmington, Del., assignor to E. I. du Pont de Nemours and Company, Wilmington, Del., a corporation of Delaware
No Drawing. Filed Jan. 20, 1958, Ser. No. 709,736
2 Claims. (Cl. 167—42)

This invention concerns fungicidal compositions containing zinc ethylene bis(dithiocarbamate), and is more particularly directed to such compositions which are fully compatible with oil-water emulsions.

I have found that fungicidal formulations containing zinc ethylene bis(dithiocarbamate), guar gum, methylcellulose and Attaclay, are fully compatible with oil-in-water emulsions used as foliage sprays to citrus trees and the like. This compatibility is achieved without affecting the desirable "breaking" characteristics of oil-in-water emulsions.

It is particularly important that oil-in-water emulsions, intended for use as foliage sprays, for example on citrus trees, separate or "break" into separate and distinct continuous phases of oil and water, respectively, within a short time interval after the agitation sustaining the emulsion ceases. Thus, after a sprayable oil-in-water emulsion containing a composition of this invention is sprayed upon foliage, the emulsion "breaks" on the foliage, leaving the composition and a residual oil film on the leaves, with a minimum of undesirable run-off of active ingredients.

It is often desirable to apply fungicides to citrus at the same time as insecticides. Fungicides are often used as wettable powders which give a fine dispersion when mixed into water. The insecticides are often used in the form of emulsifiable oil solutions which, when added to water, form an emulsion. If the two active ingredients are to be applied together from the same spray composition, they must be compatible. Unfortunately, conventional wettable powder fungicides often cannot be used together with insecticidal emulsifiable oils in the same spray tank. Efforts to prepare such mixtures often result in the formation of large curds, or lumps, or both, which float on the surface and make the water slurry unsprayable. The present novel fungicidal zinc ethylene bis(dithiocarbamate) formulation avoids this difficulty, and can be mixed with emulsifiable oils containing insecticides. Surprisingly, the "breaking" characteristics of the oil-in-water emulsion are substantially completely unaffected.

As mentioned, the compositions of this invention contain zinc ethylene bis(dithiocarbamate), guar gum, methylcellulose and Attaclay.

Zinc ethylene bis(dithiocarbamate) is commonly obtained from the reaction of a soluble zinc salt with a solution of disodium ethylene bis(dithiocarbamate). The oil-compatible formulations of this invention can contain from 60 to 90 percent, by weight, of zinc ethylene bis(dithiocarbamate).

Methylcellulose is a product of commerce and is sold, for example, under the proprietary name "Methocel." It is an ether of cellulose formed by interaction of the methyl ester of an inorganic acid, for example, methyl chloride, with alkali cellulose. The characteristics of methylcellulose vary widely with the degree of methylation. The preparation of methylcelluloses in general, and the characteristics and properties of those useful in compositions of this invention in particular, are disclosed in "Colloidal Chemistry," volume 6, pages 926–928 (Reinhold Publishing Corp., 1946). The kinds of methylcellulose which are particularly suitable for use in the compositions of this invention are those which are soluble in cold water and a 2% water solution of which will have a viscosity of 13 to 100 cps. at 20° C. From about 0.5 to 2.0 percent by weight of methylcellulose can be used in the compositions of this invention.

The guar gum in the present formulations can be any guar gum which is known and commonly used in the art. It is obtained from the seeds of the guar plant and consists principally of a complex carbohydrate polymer of galactose and mannose. From about 0.8 to 1.4 percent by weight of guar gum can be used in the formulations of the present invention.

The Attaclay or fuller's earth used can be any type known in the art and used for formulating with fungicides. Preferably, the clay used in the instant formulations should be predominantly non-bentonitic and non-reactive with other components in the composition. From about 5 to 39 percent by weight of Attaclay can be used in the formulations of the present invention.

Thus, the dry fungicidal compositions of this invention which are compatible with an oil-in-water emulsion can contain from about 60 to about 90 parts by weight of zinc ethylene bis(dithiocarbamate), about 0.8 to 1.4 parts by weight of guar gum, about 5 to 39 parts by weight of Attaclay and about 0.5 to 2.0 parts by weight of methylcellulose, the total number of parts in the composition totaling 100.

Preferably, the compositions of the present invention contain, on a dry weight basis, from 0.5 to 2.0 parts of methylcellulose, from 65 to 75 parts of zinc ethylene bis(dithiocarbamate), from 0.8 to 1.4 parts of guar gum, and from 22 to 34 parts of Attaclay, the total weight of the constituents in any one formulation being 100.

The proportions of zinc ethylene bis(dithiocarbamate), methylcellulose, guar gum and Attaclay are important in the compositions of the present invention. The dry compositions of the invention are prepared by bringing together the zinc ethylene bis(dithiocarbamate) and the methylcellulose, Attaclay, and guar gum in any convenient manner to give an intimate mixture. Thus, the indicated ingredients can be brought together as dry solids and dry blended using conventional mixing equipment such as a ribbon blender. Then the resulting mix can be ground, for example in a micropulverized or other impact mill until substantially the entire product has a particle size of about 50 microns or less.

In preparing spray mixtures containing the dry compositions of the invention in an oil-in-water emulsified spray, a given quantity of dry composition is mixed with definite volumes of oil and water using conventional mixing equipment. The resulting mix is kept agitated to an extent sufficient to maintain the emulsion until spraying.

The percentage of solids present in the sprayable oil-in-water emulsion depends upon the amount of zinc ethylene bis(dithiocarbamate) desired in the formulation. Usually, the spray will contain a content of zinc ethylene bis(dithiocarbamate) in the range of from about 0.1 to 0.2 weight percent, although, depending on particular application conditions and needs, more or less than this amount of zinc ethylene dis(dithiocarbamate) will be used. For example, one might desire to use as much as 1% zinc ethylene bis(dithiocarbamate) in the sprayable emulsions.

Zinc ethylene bis(dithiocarbamate) is a potent fungicide so that even in very small amounts it is usually completely effective against fungus infestations. The amount of zinc ethylene bis(dithiocarbamate)—also called zineb commercially—used in any particular application depends upon a number of factors such as the extent and type of infestation, the particular type of foliage to be treated, atmospheric conditions, and similar considerations.

Similarly, the amount of oil in the sprayable oil-in-water emulsions will vary, being dependent upon a number of factors such as, economic considerations, atmospheric conditions, presence of other pesticides in the spray, infestation being treated, and like factors. The amount of oil used is largely dependent upon the desires of the particular user. Usually, a spray mixture will contain an amount of oil in the neighborhood of from about 1 to 1.5% by volume, although some applicators might wish to use 2% or even 2.5%, for example. If the correct amount of oil is used, a thin coating of oil will be deposited over the sprayed surface area.

The oils used in these emulsified sprays are non-herbicidal agricultural spray oils which are conventionally used in the treatment of foliage. Most of these oils have a 70 to 92% unsulfonatable residue, a specific gravity in the range of about 28 to 34° API, and a viscosity at 100° F. of about 95 to 108° Saybolt. Examples of such oils are very numerous. Specific illustrations are "Standard 16" and "Standard 345," both manufactured by the Standard Oil Company of New Jersey, and "Sovaspray #2" and "Sovaspray #4," both manufactured by the Socony Mobil Oil Company.

Optionally, the sprayable oil-in-water emulsions containing the compatible fungicidal compositions of the invention can contain other substances, provided, of course, that such substances are compatible with the particular emulsion involved. Thus, as has been mentioned, insecticides can be incorporated in emulsions containing the zineb formulations of the invention. Examples of such insecticides include DDT, methoxychlor, parathion, and lindane.

Also, one might optionally wish to add a fully compatible emulsifier, wetting agent, surface active agent or the like to emulsions containing the formulations of the invention, depending upon the particular application conditions involved. Thus, for illustration, the oil used may already contain some such additive incorporated into it. While such additives can be used in emulsions described herein, one must always be careful that such additives do not deleteriously affect the fast "breaking" chracteristics of an oil-in-water emulsion. But those familiar with the art know and understand the properties of such additives, and their use in oil-in-water emulsions is not a part of the present invention.

The emulsifiable spray oils used in the compositions of the invention will usually contain an emulsifier. Fully compatible emulsifiers can be selected from those listed by McCutcheon in an article, entitled "Synethic Detergents and Emulsifiers," appearing in the July, August, September and October 1955 issues of "Soap and Chemical Specialties" (volume 31). Usually emulsifiers will be present in amounts from about 0.2% to 2.0% in compositions of the invention, depending on the emulsion stability desired and similar considerations. More narrowly a range of from about 0.2 to 0.4% is preferred. There may be instances where oils not containing emulsifying agents are used. In such cases a sufficient amount of an emulsifier must be added to the sprayable slurry, and in an amount as just indicated.

An outstanding advantage of the dry fungicidal, oil-in-water emulsion compatible formulations of the invention is that they can also be prepared as purely aqueous sprays, as for use on vegetable crops and the like. Thus, these dry formulations have many uses besides their use in spray emulsions.

In order that the invention can be better understood, the following examples are given, in addition to the examples already given above. The examples illustrate typical fungicidal compositions of the invention, methods for their preparation, fungicidal applications, and results obtained. The numbers following the tabulated ingredients represent parts by weight of the ingredients in the respective composition.

*Example I*

To a commercial spray tank containing 415 parts of water and 4 parts of emulsifiable spray oil is added 4 parts of "Parzate," a commercial fungicidal formulation containing zinc ethylene bis(dithiocarbamate). The mixture is then agitated to form a coarse dispersion with a marked degree of flocculation. When agitation is discontinued, the oil does not separate cleanly from the zineb but forms a greasy froth containing both oil and zinc ethylene bis(dithiocarbamate). This greasy froth does not redisperse readily when agitation is restarted and a heavy flocculation is apparent. This behavior is undesirable because it tends to produce a spotty deposit on sprayed fruit.

The emulsifiable spray oil is Sun Superior Spray Oil Number 11, a spray oil with a sulfonatable fraction of not more than 8%. The emulsifier is Triton B–1956 a modified phthalic glycerol alkyd resin as an emulsifier. The ratio of oil to emulsifier is 399 parts to one, respectively.

*Example II*

A composition of the invention comprising 735 parts of technical zinc ethylene bis(dithiocarbamate), 245 parts of Attaclay, 10 parts of guar gum and 10 parts of methylcellulose having a viscosity of 15 cps. at 20° C. is prepared by thoroughly mixing the components and then grinding in a hammer mill to an average particle size of less than 50 microns.

A water dispersion is then prepared by adding 4 parts of the above zineb formulation to the tank of a commercial spray rig which contains an agitated mixture consisting of 415 parts of water and 4 parts of emulsifiable spray oil. The emulsifiable spray oil is a commonly employed mixture of non-herbicidal oil and emulsifying agent in the ratio of 399 parts of oil to 1 part of emulsifying agent. The emulsifiable spray oil is Sun Superior Spray Oil Number 11, a spray oil with a sulfonatable fraction of not more than 8%. The emulsifier is Triton B–1956, a modified phthalic glycerol alkyd resin.

In addition to Triton B–1956, other emulsifiers can be used for example Kessler emulsifier X–34 and Atlox G–1086 (polyoxyethylene sorbitol hexaoleate). Other compatible emulsifiers as listed by McCutcheon in an article, entitled "Synthetic Detergents and Emulsifiers," July, August, September and October of 1955, found in volume 31 of "Soap and Chemical Specialties," can be used in the formulations.

The agitated spray mixture which is formed from the above-described ingredients is a uniform homogeneous suspension in which the components are very finely dispersed. When agitation of the spray mixture is stopped, a clean separation of the components is observed; the oil rising slowly to the top and the zinc ethylene bis(dithiocarbamate) settling slowly to the bottom of the spray tank. When agitation is resumed, the original homogeneous suspension is resorted. The observed behavior is considered ideal for trouble-free spray application and for deposition of both oil and fungicide on the foliage of citrus trees.

*Example III*

To a commercial spray tank containing 415 parts of water is added 1 part of "Parzate," a commercial fungicide formulation containing zinc ethylene bis(dithiocarbamate). The "Parzate" is dispersed into a fine suspension by agitating the tank; then 4 parts of emulsifiable spray oil are added and dispersed by further agitation. The emulsifiable spray oil comprises an ordinary spray oil containing not more than 8% sulfonatable fraction and a commercial emulsifying agent Triton B–1956 (a modified phthalic glycerol alkyd resin) in the ratio 399 parts oil to 1 part emulsifier.

The suspension slightly flocculates, and when agitation is discontinued the components of the mixture do not separate cleanly but form a greasy froth containing both oil and zinc ethylene bis(dithiocarbamate). This behavior is undesirable for foliage application. This greasy froth which formed on standing does not redisperse readily when agitation is restarted, leading to operating difficulties.

*Example IV*

A composition of the invention comprising 735 parts of technical zinc ethylene bis(dithiocarbamate), 245 parts of Attaclay, 10 parts of guar gum and 10 parts of methylcellulose having a viscosity of 15 cps. at 20° C. is prepared by first thoroughly mixing the components and then grinding in a hammer mill.

A water dispersion is then prepared by adding 1 part of this zinc ethylene bis(dithiocarbamate) formulation of the invention to 415 parts of water contained in the tank of a commercial spray rig. Agitation of this mixture causes a fine dispersion to form to which is added 4 parts of an emulsifiable oil comprising an ordinary spray oil containing not more than 8% sulfonatable fraction and a common commercial emulsifying agent Triton B–1956 (a modified phthalic glycerol alkyd resin) in the ratio of 399 parts oil to 1 part emulsifier.

The agitated spray mixture so formed from the described ingredients is a uniform homogeneous suspension in which the components are very finely dispersed. When agitation of the components is discontinued, a clean separation of the components is observed; the oil rising slowly to the top and the zinc ethylene bis(dithiocarbamate) settling slowly to the bottom of the spray tank. The observed separation is considered ideal to insure a uniform and continuous film on sprayed fruit and foliage without spotting and uneven treatment. When agitation of the separated and settled mixture is resumed the original homogeneous suspension is restored, thus showing that the properties of the mixture are also ideal to insure uniform and trouble-free spray application.

*Example V*

A composition of the invention comprising 735 parts of zinc ethylene bis(dithiocarbamate), 245 parts of Attaclay, 10 parts of guar gum and 10 parts of methylcellulose having a viscosity of 15 cps. at 20° C. is prepared by first thoroughly mixing and then grinding in a hammer mill.

A water dispersion is then prepared by adding 1 part of the zinc ethylene bis(dithiocarbamate) formulation to 415 parts of water containing also 4 parts of emulsifiable spray oil and 1 part of a commercial preparation of parathion which is in the form of a wettable powder containing 15% parathion. The emulsifiable spray oil comprises an ordinary spray oil with a sulfonatable fraction of not more than 8% and a common commercial emulsifying agent, Triton B-1956, which is a modified phthalic glycerol alkyd resin, the mixture being prepared in the ratio 399 parts oil to 1 part emulsifier as is done in common commercial practice.

The mixture formed after agitation of the above described ingredients is a uniform homogeneous suspension in which the components are very finely dispersed. When agitation is discontinued a clean separation of the components is observed with the oil rising to the top and the zinc ethylene bis(dithiocarbamate) and parathion sinking to the bottom of the spray tank. The separation observed is almost ideal since clean separation of the oil is necessary to insure a uniform continuous deposit upon sprayed foliage on fruit without spotting. When agitation of the separated mixture is resumed the original homogenous suspension is restored.

*Example VI*

A composition of the invention comprising 900 parts of zinc ethylene bis(dithiocarbamate), 10 parts guar gum, 20 parts "Methocel," 15 and 70 parts Attaclay is prepared by first thoroughly mixing and then grinding the components in a hammer mill.

A water dispersion is then prepared by adding 1 part of the zinc ethylene bis(dithiocarbamate) formulation to 415 parts of water contained in the tank of a commercial spray rig. The water contains sufficient oil to produce a ratio of 0.8 part of zinc ethylene bis(dithiocarbamate) formulation to 6 parts of oil. The oil used was Standard 345 which is an oil containing about 30% sulfonatable fraction.

The agitated spray mixture so formed from the described ingredients is a uniform homogeneous suspension in which the components are very finely dispersed. When agitation of the components is discontinued, a clean separation of the components is observed; the oil rising slowly to the top and the zinc ethylene bis(dithiocarbamate) settling slowly to the bottom of the spray tank. The observed separation is considered ideal to insure a uniform and continuous film on sprayed fruit and foliage without spotting an uneven treatment. When agitation of the separated and settled mixture is resumed the original homogeneous suspension is restored, thus showing that the properties of the mixture are also ideal to insure uniform and trouble-free spray application.

*Example VII*

A composition of the invention comprising 600 parts zinc ethylene bis(dithiocarbamate), 10 parts guar gum, 20 parts methylcellulose having a viscosity of 100 cps. at 20° C. and 370 parts Attaclay is prepared by first thoroughly mixing and then grinding the components in a hammer mill. A water dispersion is then prepared by adding 1.2 parts of the zinc ethylene bis(dithiocarbamate) formulation to 415 parts of water in a commercial spray tank. The water contains 4 parts of an emulsifiable spray oil. The oil used was Standard 16 oil, an oil which contains not more than 8% sulfonatable fraction.

The agitated spray mixture so formed from the described ingredients is a uniform homogeneous suspension in which the components are very finely dispersed. When agitation of the components is discontinued, a clean separation of the components is observed; the oil rising slowly to the top and the zinc ethylene bis(dithiocarbamate) settling slowly to the bottom of the spray tank. The observed separation is considered ideal to insure a uniform and continuous film on sprayed fruit and foliage without spotting an uneven treatment. When agitation of the separated and settled mixture is resumed the original homogeneous suspension is restored, thus showing that the properties of the mixture are also ideal to insure uniform and trouble-free spray application.

The claims are:

1. A dry fungicidal composition compatible with an oil-in-water emulsion containing from about 60 to about 90 parts by weight of zinc ethylene bis(dithiocarbamate), about 0.8 to 1.4 parts by weight of guar gum, about 5 to 39 parts by weight of Attaclay and about 0.5 to 2.0 parts by weight of methylcellulose, the total number of parts in the composition totaling 100.

2. A spray comprising an oil-in-water emulsion containing a dispersed fungicidal composition containing, on a dry weight basis, from about 60 to about 90 parts by weight of zinc ethylene bis(dithiocarbamate), about 0.8 to 1.4 parts by weight of guar gum, about 5 to 39 parts by weight of Attaclay, and about 0.5 to 2.0 parts by weight of methylcellulose, the total number of parts in the dry composition totaling 100.

References Cited in the file of this patent

UNITED STATES PATENTS

| | | |
|---|---|---|
| 2,745,781 | Stewart | May 15, 1956 |
| 2,745,782 | Stewart | May 15, 1956 |
| 2,778,768 | Brown | Jan. 22, 1957 |
| 2,843,518 | Lambrech | July 15, 1958 |
| 2,870,059 | Williams | Jan. 20, 1959 |